United States Patent
Massing et al.

(10) Patent No.: US 9,597,585 B2
(45) Date of Patent: Mar. 21, 2017

(54) GAMIFYING SEARCH ENGINE RESULTS

(71) Applicant: WMS GAMING, INC., Waukegan, IL (US)

(72) Inventors: Scott Alan Massing, Lincolnwood, IL (US); Andrew Guinn, Chicago, IL (US); Richard Robbins, Glenview, IL (US); Brian K. Danilo, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 819 days.

(21) Appl. No.: 13/841,639

(22) Filed: Mar. 15, 2013

(65) Prior Publication Data
US 2014/0274363 A1    Sep. 18, 2014

(51) Int. Cl.
| | |
|---|---|
| *A63F 13/30* | (2014.01) |
| *G07F 17/00* | (2006.01) |
| *G06F 17/30* | (2006.01) |
| *G06Q 30/02* | (2012.01) |
| *G07F 17/32* | (2006.01) |

(52) U.S. Cl.
CPC ............. *A63F 13/12* (2013.01); *G06F 17/30* (2013.01); *G06F 17/30864* (2013.01); *G06Q 30/0207* (2013.01); *G06Q 30/0241* (2013.01); *G07F 17/00* (2013.01); *G07F 17/32* (2013.01); *G07F 17/3262* (2013.01)

(58) Field of Classification Search
CPC ...... G07F 17/00; G07F 17/32; G07F 17/3262; G06F 17/30; A63F 13/12
See application file for complete search history.

(56) References Cited

U.S. PATENT DOCUMENTS

| | | | |
|---|---|---|---|
| 7,478,110 B2 | 1/2009 | von Ahn Arellano et al. | |
| 7,818,205 B2 | 10/2010 | Clark et al. | |
| 8,140,518 B2 | 3/2012 | Dasdan et al. | |
| 8,348,764 B2 | 1/2013 | Cerbini | |
| 8,682,720 B1* | 3/2014 | Wills et al. | 705/14.4 |
| 2002/0138342 A1* | 9/2002 | Clark et al. | 705/14 |
| 2004/0122811 A1* | 6/2004 | Page | 707/3 |
| 2006/0063587 A1* | 3/2006 | Manzo | 463/25 |
| 2006/0069619 A1* | 3/2006 | Walker et al. | 705/14 |
| 2006/0095790 A1* | 5/2006 | Nguyen et al. | 713/186 |
| 2006/0282312 A1* | 12/2006 | Carlson et al. | 705/14 |
| 2006/0293065 A1* | 12/2006 | Chew et al. | 455/456.3 |
| 2007/0016559 A1* | 1/2007 | Kraft | 707/3 |
| 2007/0202941 A1* | 8/2007 | Miltenberger et al. | 463/25 |
| 2008/0040221 A1* | 2/2008 | Wiseman et al. | 705/14 |
| 2008/0046312 A1* | 2/2008 | Shany et al. | 705/14 |

(Continued)

*Primary Examiner* — Jay Liddle
*Assistant Examiner* — Ryan Hsu
(74) *Attorney, Agent, or Firm* — Miller, Matthias & Hull LLP (57) ABSTRACT

A computer-implemented method in a gaming system includes, in response to a participant's search query, conducting, by one or more processors, a search on a search engine through a web browser; and presenting, by at least one of the one or more processors, search engine results including one or more standard indices and one or more incentivized indices, each of the one or more standard indices including a selectable hyperlink for directing the participant to a third-party website, each of the one or more incentivized indices including a selectable hyperlink for playing a game.

30 Claims, 6 Drawing Sheets

(56) References Cited

U.S. PATENT DOCUMENTS

| | | |
|---|---|---|
| 2009/0013288 A1* | 1/2009 | Scheflan ............... 715/859 |
| 2012/0094768 A1* | 4/2012 | McCaddon ............ A63F 13/12 |
| | | 463/42 |
| 2012/0295696 A1 | 11/2012 | Anderson et al. |
| 2012/0295697 A1 | 11/2012 | Anderson et al. |
| 2012/0329552 A1 | 12/2012 | Caspers et al. |
| 2013/0060767 A1 | 3/2013 | Bowers et al. |
| 2013/0066844 A1 | 3/2013 | Bowers et al. |

* cited by examiner

GAMIFYING SEARCH ENGINE RESULTS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE DISCLOSURE

The present disclosure relates generally to gaming systems and methods and, more particularly, to integrating gaming sessions into search engine results.

BACKGROUND OF THE DISCLOSURE

Electronic gaming services including online contests, sweepstakes, games of chance, wagering games, such as video slots, video poker, and the like, are available for play from various internet-based sites. Increasingly more gaming services are also provided in conjunction with internet-based advertisements to create incentives for participating in a game and to promote an end-product or service. Among other internet-based services or devices, the search engine is one of the most frequently and widely used by internet users, and it attributes to much, if not most, of the incoming web traffic for a given company's web site. Given the search engine's increasing versatility in directing internet-based traffic, and its inherent influence on potentially profitable conversions arising therefrom, a need exists to further enhance the promotional value to companies marketing online as well as the overall experience of the internet user. More specifically, a need exists for integrating gaming sessions into search engines and/or search results.

SUMMARY OF THE DISCLOSURE

According to one aspect of the present disclosure, a computer-implemented method in a gaming system comprises, in response to a participant's search query, conducting, by one or more processors, a search on a search engine through a web browser; and presenting, by at least one of the one or more processors, search engine results including one or more standard indices and one or more incentivized indices, each of the one or more standard indices including a selectable hyperlink for directing the participant to a third-party website, each of the one or more incentivized indices including a selectable hyperlink for playing a game.

According to another aspect of the present disclosure, one or more physical machine-readable storage media include instructions which, when executed by one or more processors, cause the one or more processors to perform operations comprising, in response to a participant's search query, conducting a search on a search engine through a web browser; and presenting search engine results including one or more standard indices and one or more incentivized indices, each of the one or more standard indices including a selectable hyperlink for directing the participant to a third-party website, each of the one or more incentivized indices including a selectable hyperlink for playing a game.

According to another aspect of the present disclosure, a gaming system comprises one or more clients being provided to a participant on one or more computational devices having one or more input devices and one or more output devices; and one or more gaming servers in communication with the one or more clients over one or more networks comprising one or more search engines where each of the one or more gaming servers have one or more processors and one or more memory devices storing instructions that, when executed by the one or more processors, cause the one or more gaming servers to retrieve one or more incentivized indices to be presented to the participant in response to a search that is executed on the one or more search engines by the participant, and initiate one or more gaming sessions configured to interact with the participant at the one or more clients if the participant selects any of the one or more incentivized indices.

According to another aspect of the present disclosure, a computer-implemented method for a gaming system comprises receiving information pertaining to a search being performed by a participant through one or more input devices of a computational device where the search is relevant to a third-party; retrieving one or more incentivized indices from one or more gaming servers to be displayed to the participant based on the search; initiating one or more gaming sessions configured to interact with the participant via the computational device if the participant selects any one of the one or more incentivized indices.

According to yet another aspect of the present disclosure, a tangible machine-readable storage media includes instructions which, when executed by one or more processors, cause the one or more processors to perform operations comprising monitoring for one or more inputs from a participant submitted through one or more input devices of a computational device; retrieving one or more incentivized indices from one or more gaming servers to be displayed to the participant at an output device of the computational device if the participant provides one or more inputs where each of the one or more incentivized indices corresponds to one or more standard indices associated with one or more third-party servers; initiating a gaming session for interacting with the participant if the participant selects one of the one or more incentivized indices.

Additional aspects of the present disclosure will be apparent to those of ordinary skill in the art in view of the detailed description of various embodiments, which is made with reference to the drawings, a brief description of which is provided below.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the appended claims.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. While the present disclosure may be embodied in many different forms, the embodiments set forth in the present disclosure are to be considered as exemplifications of the principles of the present disclosure and are not intended to be limited to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Network

Figure 1:
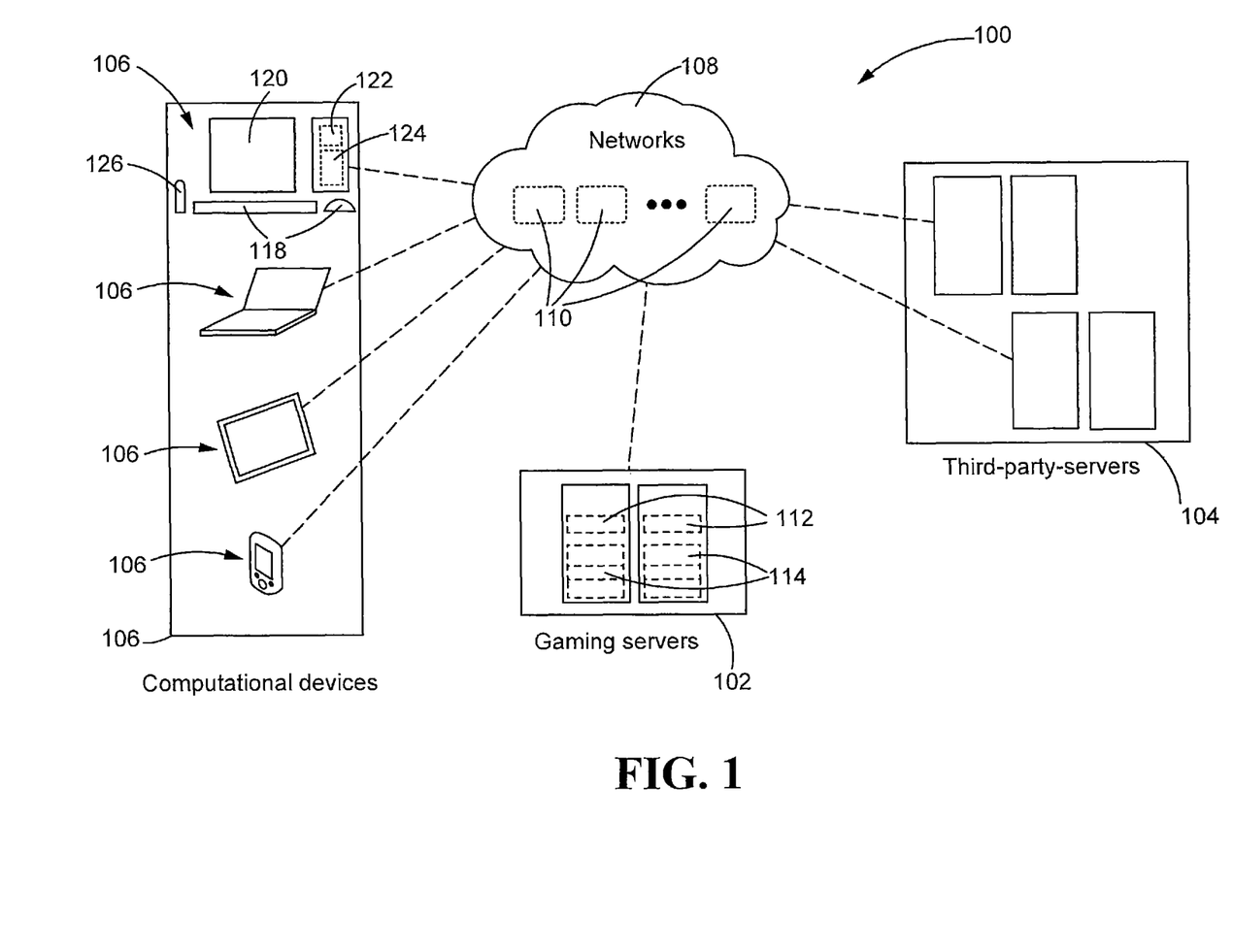
FIG. 1 is a schematic view of a gaming system according to an embodiment of the present disclosure.

Referring to FIG. 1, one exemplary embodiment of a gaming system 100 is provided. In general, the gaming system 100 may be implemented to manage and/or facilitate certain interactions between internet-based search providers, gaming service providers, players or participants of games of chance provided by the gaming service providers, as well as third-party companies or entities marketing services and/or products via the internet. As shown, the gaming system 100 may incorporate one or more gaming servers 102, one or more third-party servers 104, one or more computational devices 106, as well as one or more networks 108 electronically communicating information between each of the gaming servers 102, third-party servers 104 and computational devices 106. Furthermore, one or more search engines 110 may be provided via the one or more networks 108 through which users or participants may execute internet-based searches or queries. Moreover, the network 108 may be configured to enable communications between the computational devices 106 and one or more search providers, as well as communications between the search providers and the gaming servers 102. The network 108 may thereby enable incentivized indices to be incorporated into the search results, initiate a gaming session based on the participant's selection of one of the incentivized indices, and communicate data relevant to the gaming session to one or more of the gaming servers 102 and the third-party servers 104, as will be discussed in more detail further below. Specifically, the network 108 may take the form of a local area network (LAN), a wireless cellular data network, a wide area network (WAN) such as the internet, or any other suitable network or combination of networks enabling local and/or remote communications between the gaming servers 102, third-party servers 104 and the computational devices 106.

Gaming Service Providers

As shown in FIG. 1, the gaming system 100 may include one or more gaming servers 102 which are managed or operated by gaming service providers and configured to enable registered players or participants to participate in any one or more of a variety of gaming services or sessions, such as games of chance, wagering games, contests, sweepstakes, and the like, over the one or more networks 108 provided. Correspondingly, the gaming servers 102 may be configured to manage a plurality of databases including, for example, a participant database and a gaming session database, among other things. The gaming servers 102 may further be configured to communicate with one or more of the search engines 110 in a manner enabling the gaming servers 102 to present incentivized indices, such as sponsored search results, hyperlinks, or the like, corresponding to web sites hosted by one or more of the third-party servers 104. The gaming servers 102 may additionally be configured to communicate any data relevant to gaming sessions that are initiated by the participant's selection of one of the incentivized indices. Relevant gaming session data may include one or more funding mechanisms that may be placed on behalf of the participant and/or the participant's winnings. Funding mechanisms may be provided in the form of the participant's own wager, or funding sourced on behalf of the participant by the search providers, third-parties, or the like. For example, a third-party or a search provider may choose to fund a gaming event or gaming sessions in certain situations to initiate a relationship or promote the event to potential participants, and at a later time, choose to convert the funding mechanisms of those participants to self-funded mechanisms, or the like. The participant's winnings may be provided in the form of rewards, credits, or any other mechanism redeemable through a third-party, or the like. As is generally held in the art, each gaming server 102 may include at least one processor 112 and at least one memory 114 for storing instructions configured to cause the one or more processors 112 of the gaming server 102 to perform one or more preprogrammed functions or operations.

Third-Parties

The third-party servers 104 of FIG. 1 may be similarly managed or operated by one or more third-parties, such as companies or business entities which, at least in part, market their respective services and/or products via the internet. In general, the third-party servers 104 may be used to host, maintain and/or operate one or more third-party web pages or web sites serving as one or more of storefronts, advertisements, informational pages, social networks, and the like. The third-party servers 104 may further include databases for not only managing the third-party web sites, but also for managing databases of information pertaining to participants, customers, and/or members, as well as corresponding member profile information, registration information, account information, billing information, transactional information, contact information, age verification information, preference information, and the like. One or more web sites that are hosted by the third-party servers 104 may be indexable or searchable via the search engines 110 of FIG. 1 such that a search that is conducted at one of the search engines 110 and relevant to a third-party service and/or product generates a search result corresponding to the third-party web site. Participating or sponsoring third-party servers 104 may additionally be enabled to communicate with one or more of the gaming servers 102 so as to track the effectiveness of any of the incentivized indices relating thereto, or to track data pertaining to any gaming session that has been initiated by a participant's selection of the incentivized indices. Relevant gaming session data may include the participant's funding mechanisms and/or winnings which may be redeemable through the third-party, and the like. As with the gaming servers 102, web sites hosted by the third-party servers 104 may be accessible to participants via the computational devices 106 and through one or more of the networks 108.

Computational Devices

As depicted in the embodiment of FIG. 1, the computational devices 106 may take any one of a plurality of forms including a mobile device, a cellular phone, a smartphone, a tablet device, a laptop computer, a desktop computer, a device used as a checkout tool, a point-of-sale device or any other suitable device having at least one input device 118 and at least one output device 120. The input device 118 may include any one or more of a mouse, a keypad, a keyboard, a touchpad, a touchscreen, a microphone, a camera, and any other device enabling the participant to input information. The output device 120 may include any one or more of a monitor, a display screen, a touchscreen, a speaker, a dedicated device, such as smart card device with a display, or any other output device enabling a gaming session to be presented to the participant. The computational device 106 may also include one or more processors 122 and at least one memory 124 for storing instructions configured to cause the processor 122 to, among other things, facilitate and/or provide an interface through which a participant may participate in one or more gaming sessions sourced by the gaming servers 102 using the input devices 118 and output devices 120. Correspondingly, the computational device 106 may additionally include at least one communication device 126, such as a modem, a receiver, a transmitter, a transceiver, a network card, an ethernet card, magstripe, or any other communication device having wired and/or wireless connectivity with the gaming servers 102 through the one or more networks 108.

Among other things, a client that is associated with one or more of the gaming servers 102 and the third-party servers 104 may be deployed on the computational device 106. The client may configure the processor 122 of the computational device 106 to communicate with the gaming servers 102 to retrieve gaming session data, display gaming session data at the computational device 106, operate a gaming session on the computational device 106, and/or communicate any relevant input provided by the participant and received through the one or more input devices 118 back to the gaming servers 102. The computational device 106 may also be configured to communicate with the search engines 110 and/or the third-party servers 104 via one or more networks 108. The client may be initially transmitted over the one or more networks 108 and deployed or installed onto one or more computational devices 106 and integrated in one or more forms of a web browser extension, a toolbar, a plug-in, an add-on, a widget, an application, a program, a dedicated device, such as a smart card device with a display, and the like. Upon receiving the necessary actions or inputs from the participant, the computational device 106 may be configured to retrieve gaming services or gaming session data from the gaming servers 102, and/or to execute one or more gaming sessions pre-packaged within the computational device 106. The client may thus configure the computational device 106 to monitor for such actions or inputs that are submitted through the input devices 118 by the participant, such as clicking on or selecting a sponsored search result, as will be discussed in more detail further below.

Registration Page

Figure 2:
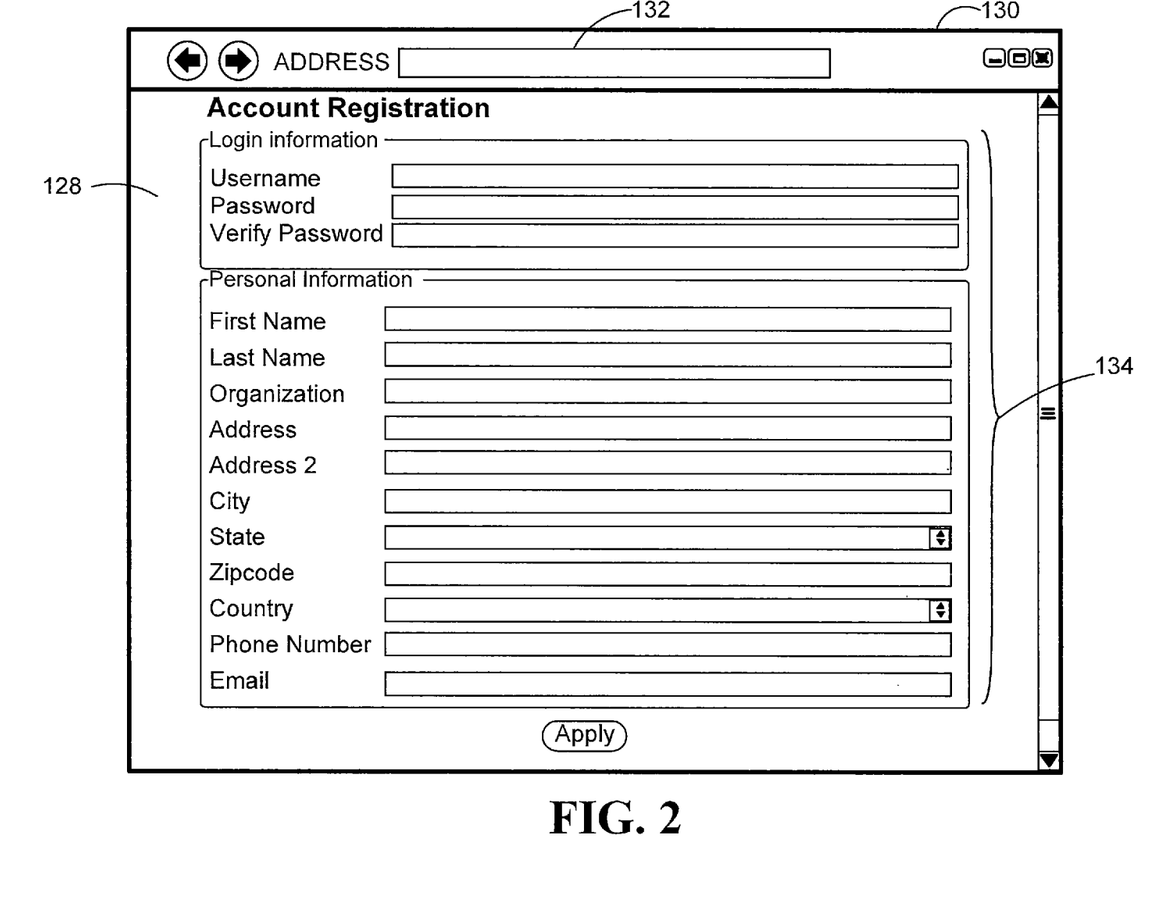
FIG. 2 is an image of an exemplary registration page for a gaming service provided through an interface displayed on an output device of a computational device, according to an embodiment of the present disclosure.

As shown in FIG. 2, a registration page 128, such as provided in a web-based format and affiliated with one or more of gaming servers 102 and/or third-party servers 104, is provided. Moreover, the registration page 128 may be provided through an interface 130, such as a web browser, or the like, of one or more computational devices 106 having connectivity to the relevant gaming servers 102 and third-party servers 104 over one or more networks 108. A new participant may be able to access or navigate to the registration page 128 by entering a uniform resource locator (URL) or web address of the particular registration page 128 into an address field 132 of the interface 130. While the registration page 128 may take any one of a variety of different forms, the registration page 128 of FIG. 2, for example, may include a plurality of entry fields 134 adapted to receive general account information, transactional or billing information, age verification information, and/or any other relevant data pertaining to the new participant. Moreover, the registration page 128 may serve to collect participant data sufficient for authorizing access to any one or more of a variety of client-based and/or network-based services associated with one or more of the gaming servers 102 or third-party servers 104. In particular, the registration page 128 may be employed to gather information pertaining to the participant's name, mailing address, contact information, electronic mailing address, and the like. The registration page 128 may also provide means for verifying participant information, such as general account information, transactional or billing information, age verification information, and any other relevant data pertaining to the participant. In addition, the registration page 128 may also establish an alias, username, login, or any other suitable means of identification through which the gaming servers 102 and/or the third-party servers 104 may be able to identify the participant and easily retrieve information relating thereto.

Search Page

Figure 3:
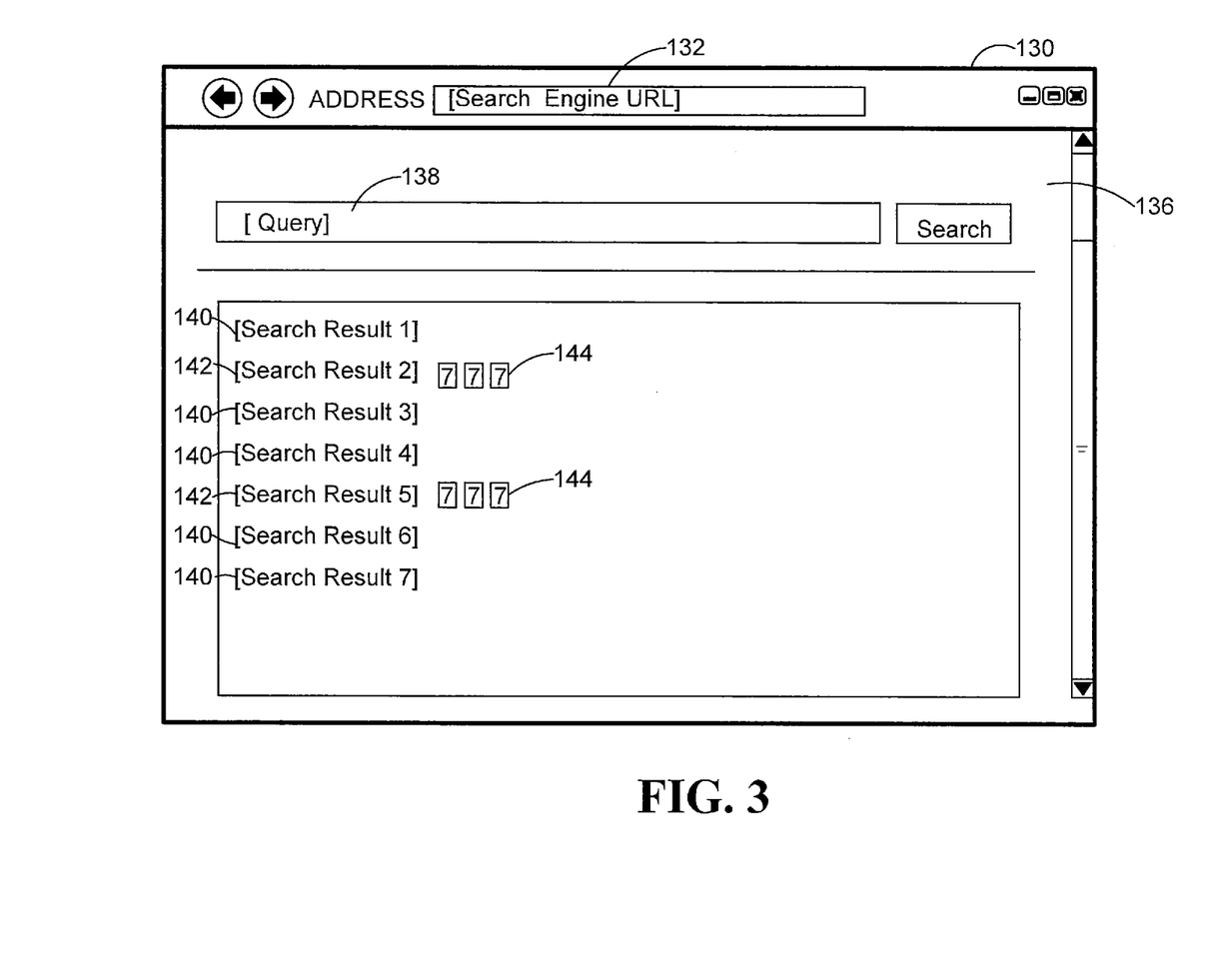
FIG. 3 is an image of an exemplary search page having a gaming service incorporated therein provided through an interface displayed on an output device of a computational device, according to an embodiment of the present disclosure.

Turning to FIG. 3, a search page 136 of a search engine 110 is provided, for instance, through a web browser interface 130, or the like, of one or more computational devices 106 having connectivity to the search engines 110 over one or more networks 108. Similar to the interface 130 of FIG. 2, the participant may be able to access the search page 136 by entering a uniform resource locator (URL) or web address of a particular search page 136 into the address field 132 of the interface 130, and directing the interface 130 to the search page 136. As with typical search engines 110, the search page 136 may provide a search field 138 within which a participant may enter and submit a query. Once a query is submitted, the search engine 110 may generate a list of one or more search results 140, as shown for example in FIG. 3. Each of the search results 140 may correspond to a web address to a different landing page that may be at least partially relevant to the query submitted by the participant. For example, each of the search results 140 may be presented in the form of a standard index transposed as a selectable link, hyperlink, or the like, that is capable of directing the interface 130 of the participant to the underlying URL or web address of the corresponding landing page. Additionally, one or more of the standard indices 140 may correspond to a web address to a landing page that is associated with and/or managed at least partially by one or more third-party servers 104.

Still referring to FIG. 3, an interface 130 of a computational device 106 having a client deployed and installed thereon may be configured to also display one or more incentivized indices 142 in addition to the standard indices 140 in response to a search that is performed by the participant. Moreover, each of the incentivized indices 142 may be indicative of a promoted or sponsored search result, or the like, for example, a link to a landing page that is associated with a third-party participating in a promotional service. The promotional service may be provided by one or more of the gaming servers 102 and intended to provide the participant with certain incentives for selecting any of the incentivized search results or indices 140. The incentives may be provided based on interactions with the participant and in varying forms, for example, in the form of funding mechanisms and/or rewards redeemable through a third-party. More specifically, the funding mechanisms and/or rewards may be provided as any one or more of credits, entries, points, coins, tokens, rewards, coupons, monetary awards, non-cash prizes, social currency, or the like. In still further modifications, alternative or additional incentives may be provided to the participant using a social game mechanism, for example, a game enabling the participant to level-up and/or progressively advance through stages of a social game. Furthermore, the social game may be delivered within the search page 136, and with each successful completion of a level or stage, the participant may be given the option to continue playing the game from within the search page 136, be redirected to a source page associated with the social game, or the like.

Similar to the standard indices 140, each of the incentivized indices 142 of FIG. 3 may be transposed as a selectable link, hyperlink, or the like, that is capable of directing the interface 130 of the participant to the underlying URL or web address of the corresponding landing page. Each of the incentivized indices 142 may be graphically distinguished from the corresponding standard indices 140 using any combination of tags 144, color-coding schemes, fonts, labels, icons, logos, highlighting, markers, watermarks, badges, borders, shading, page position, and any other means for indicating a gamified search result to the participant. The ultimate landing page of each incentivized index 142 may correspond to a web address to a landing page that is associated with and/or managed at least partially by one or more participating third-party servers 104. Still further, each incentivized index 142 may be associated with one or more of the standard indices 140, and capable of ultimately directing the interface 130 to a third-party landing page which corresponds to that of the one or more standard indices 140. Unlike the standard indices 140, however, selecting one of the incentivized indices 142 may cause the computational device 106 to at least partially communicate with one or more gaming servers 102 prior to, concurrently with, or subsequent to directing the participant to the corresponding landing page. Through such communications with the gaming servers 102, the computational device 106 may be configured to present gamified events, such as gaming sessions, or the like, to the participant through the interface 130 for interaction by the participant.

Figure 4:
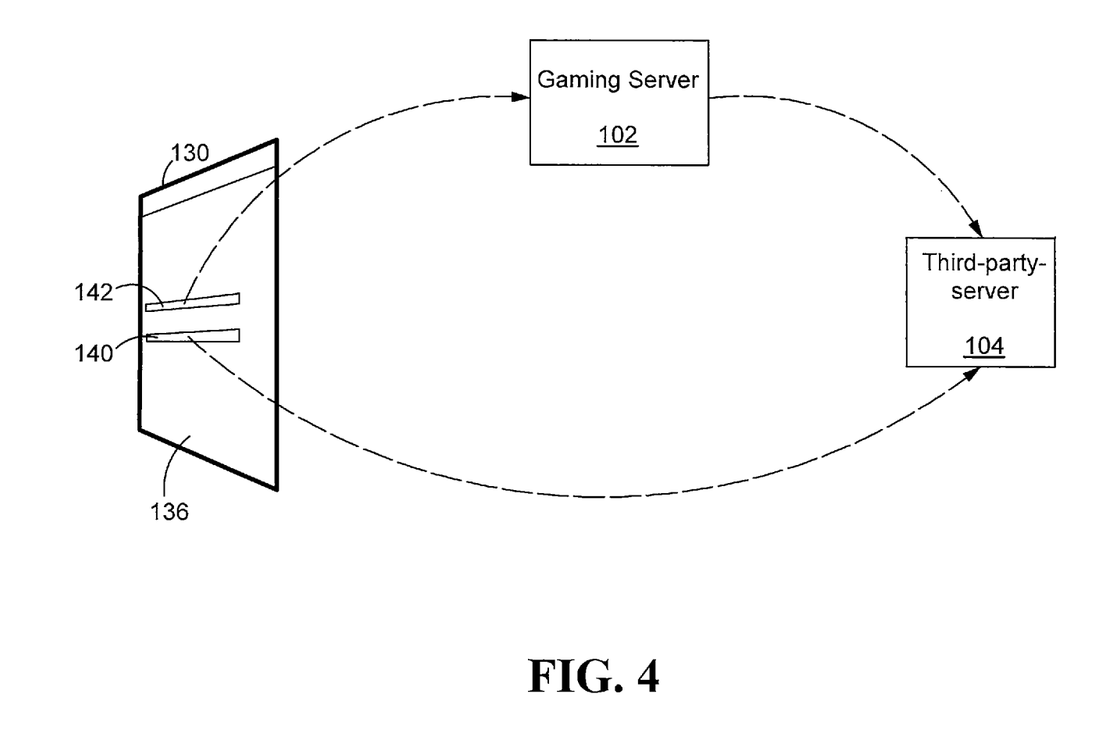
FIG. 4 is a diagrammatic view of the general communications within an exemplary gaming system according to an embodiment of the present disclosure.

As shown in FIGS. 3 and 4, for example, Search Result 2 may be an incentivized index 142 that is associated with the standard index 140 of Search Result 1. Each of the standard index 140 of Search Result 1 and the incentivized index 142 of Search Result 2 may be configured to ultimately direct the interface 130 to the same landing page, such as a promoted landing page associated with the same third-party server 104, but the participant's selection of Search Result 2 of the incentivized index 142 may provide and/or enable additional promotional features, such as gaming sessions, or the like. Similarly, Search Result 5 of FIG. 3 may be an incentivized index 142 that is associated with the underlying standard index 140 of Search Result 4, for example, where each of Search Result 4 and Search Result 5 may be relating to a landing page associated with one or more third-party servers 104 that is still partially relevant to the query but different from those of Search Result 1 and Search Result 2. As illustrated in FIG. 4, selection of the underlying URL or web address of the incentivized index 142 may cause the interface 130 to be directed or redirected to the ultimate landing page associated with one or more third-party servers 104 with at least partial communication with one or more gaming servers 102, while selection of the underlying URL or web address of the corresponding standard index 140 may cause the interface 130 to be forwarded directly to the landing page associated with one or more of the third-party servers 104. In further modifications, algorithmic implementations may be employed to regulate if, when and/or how often the incentivized indices 142 appear as a search result, and information pertaining to the corresponding third-party landing page associated therewith. Such information may be used, for example, to monitor for or regulate any abuse of the gaming sessions. In addition, funds, funds in escrowed accounts, information about previous purchases through a third-party, and the like, may also be employed to determine the frequency at which each incentivized index 142 appears, or what potential rewards may be presented to the participant at the third-party game page, pop up page, or the like. Still further, by providing more control over the incentivized indices 142 that are displayed to a participant based on the participant's eligibility or other factors, it may be possible to further influence the participant's perceptions of the gaming services or sessions provided.

Gaming Session

Figure 5:
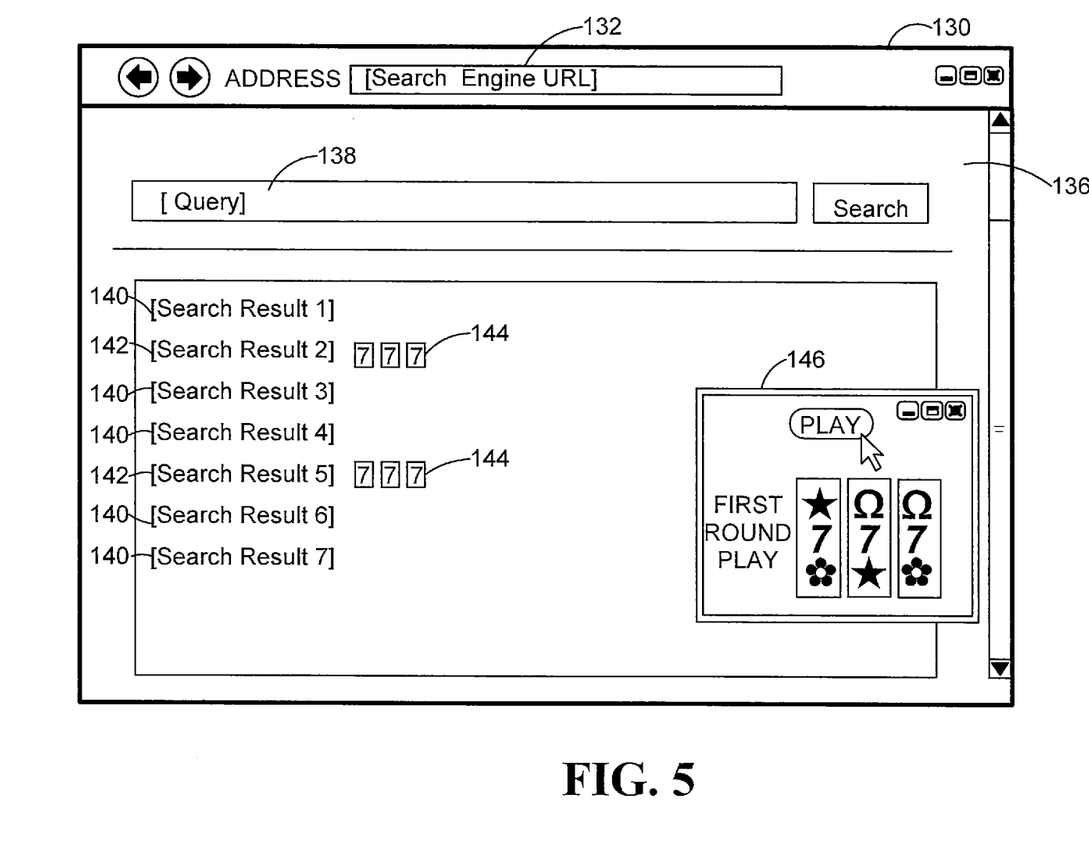
FIG. 5 is an image of an exemplary search page presenting a gaming session therein provided through an interface displayed on an output device of a computational device, according to an embodiment of the present disclosure.

Turning now to FIG. 5, one exemplary gaming session 146 that may be presented to the participant via the interface 130 is provided. In particular, the gaming session 146 may be displayed to the participant in response to the participant's selection of one or more of the incentivized indices 142. The participant may select one or more of the incentivized indices 142 through one or more means and using one or more input devices 118 of the computational device 106, such as by mouse-click, mouse-over, touch, key-press, and the like. Additionally, the gaming session 146 may be presented in the form of a pop-up view, window, or the like, relative to the main interface 130, thereby enabling the interface 130 to concurrently direct the participant to the third-party servers 104 and continue rendering the desired third-party landing pages. In other modifications, the desired third-party landing pages may be made viewable to the participant only after at least partial interaction with the gaming session 146, or conversely, the gaming session 146 may be presented to the participant only after the participant has visited at least one third-party landing page. Still further, the gaming session 146 may be configured to enable multiple gaming sessions and/or to provide the participant with continued gameplay as desired. Although presented in the form of a pop-view, the gaming session 146 may also be presented at the computational device 106 via one or more of an overlaid view, a foreground view, a background view, a full-screen view, or the like.

Still referring to FIG. 5, the gaming session 146 may be configured to provide the participant with any one or more of a variety of different games of chance, wagering games, contests, sweepstakes, any other gaming services that may be supported or provided by the gaming servers 102 and configured to interact with the participant through the input and output devices 118, 120 of the corresponding computational device 106. For example, while displaying images, video, audio, and/or any other media during a particular gaming session 146, the interface 130 may also be configured to receive various inputs from the participant during gameplay. Based on the type of computational device 106 being used and the types of input devices 118 available to the participant, for example, the participant may provide game input using actions such as mouse-clicks, keystrokes, mouse gestures, finger or hand gestures, voice commands, and the like. Such participant input may be read by the computational device 106 and used to determine the corresponding actions and/or selections that are desired by the participant. The relevant actions, selections and/or results from a particular gaming session 146 may then be communicated to the respective gaming servers 102 in a manner which enables the participant to advance through levels or stages of a game of chance, gain entry into contests or sweepstakes, acquire credits, rewards, points, or the like. If, for example, the gaming session provides a game of chance or wagering game, the game may be video slots, video poker, video blackjack, video bingo, video keno, video roulette, or the like. Using a random number generator or other comparable means, the gaming servers 102 may randomly select a game outcome from a plurality of possible outcomes and cause the outcome to be presented to the participant on the display 120 of the computational device 106. In a video slot game, for instance, the outcome may be presented via a plurality of symbol-bearing reels that are rotated and stopped to place symbols on the reels in visual association with a symbol array. The symbols landing in the array may further represent the selected game outcome.

Among other possible implementations, the gaming session 146 as shown in FIG. 5 may be configured to receive one or more funding mechanisms placed on behalf of the participant, which may further enable gameplay and one or more opportunities to win rewards. Funding mechanisms may include any one or more of a wager that is placed by a participant, or funding sourced on behalf of the participant by a third-party, search provider, or the like. The form of funding mechanism employed may also be modified over time. For example, a third-party or a search provider may choose to fund a gaming event or gaming sessions in certain situations to initiate a relationship or promote the event to potential participants, and at a later time, choose to convert the funding mechanisms of those participants to self-funded mechanisms, or the like. Funding mechanisms may be placed in the form of play credits, social currency, actual monetary values, or the like, and further, may be at least partially redeemable through a participating third-party. For instance, at least a portion of each funding mechanism placed on behalf of a participant may be applied toward a service and/or product provided by the third-party, thereby urging a commitment between the participant and the third-party. Other forms of incentives may also be provided, for instance, using a social game mechanism, or the like, configured to enable the participant to level-up and/or progressively advance through stages of a social game. One or more rewards awarded to the participant may take the form of credits, entries, points, coins, tokens, rewards, coupons, monetary awards, non-cash prizes, social currency, or the like, and may similarly be at least partially redeemable through a participating third-party, thereby gamifying as well as incentivizing the participant's selection of incentivized indices 142 over non-incentivized or standard indices 140. Moreover, each gaming session 146 may provide any one of a plurality of different reward types of varying values. Furthermore, the odds of winning a particular reward may be fixed, predefined and/or partially based on the funding mechanism anticipated for the participant, thereby providing participating third-parties with a better expectation of payouts.

During or upon close of a gaming session 146, any portion of the funding mechanisms placed and/or the winnings, rewards, or credits accumulated by a particular participant may be communicated over one or more networks 108 from the computational device 106 to any one or more of the relevant gaming servers 102 and the third-party servers 104 so as to update or synchronize any data pertaining to the participant therebetween as necessary. For example, data pertaining to a participant who has won rewards sufficient for a free dinner at a participating third-party restaurant or related establishment may be communicated from the computational device 106 to the relevant gaming servers 102 and stored within one or more databases thereof. The resulting data, for instance, data linking a particular participant to a particular reward, may then be forwarded by the gaming servers 102 to the relevant third-party servers 104 and/or directly referenced by the third-party servers 104, so as to accurately coordinate the relevant rewards and/or payouts for a particular participant with the third-parties in a timely and systematic manner.

In still further modifications, the gaming session 146 may additionally or alternatively be presented to the participant in the form of location-based and/or time-based gaming sessions, or gaming sessions which produce incentives to the participant based on the location of the participant and/or a predefined time constraint. More particularly, the client of the computational device 106 may be configured the processor 122 to access data cached, for instance, within a memory 124 of the computational device 106, which may correspond to previous searches conducted by the participant through one or more interfaces 130 of the computational device 106. Furthermore, the computational device 106 may be configured to employ location-detection applications or tools, such as global positioning systems (GPS), or the like, which may be installed or provided on mobile or portable computational devices 106, to access information pertaining to the participant's proximate location relative to participating third-party establishments. If the participant is determined to be within a reasonable distance from a sponsoring third-party establishment, which may be of interest to the participant as determined via the participant's search history or cached data, the location-based gaming session may generate an automated notification providing the participant with additional incentives for visiting the third-party establishment. Additionally or alternatively, the computational device 106 may be configured to automatically provide a predefined time constraint during which the participant may be offered certain incentives for visiting a third-party establishment, visiting a third-party web page or storefront, making a purchase for a third-party service or product, or the like.

Algorithms/Methods for Converting Measured Effects into Gaming Incentives

Figure 6:
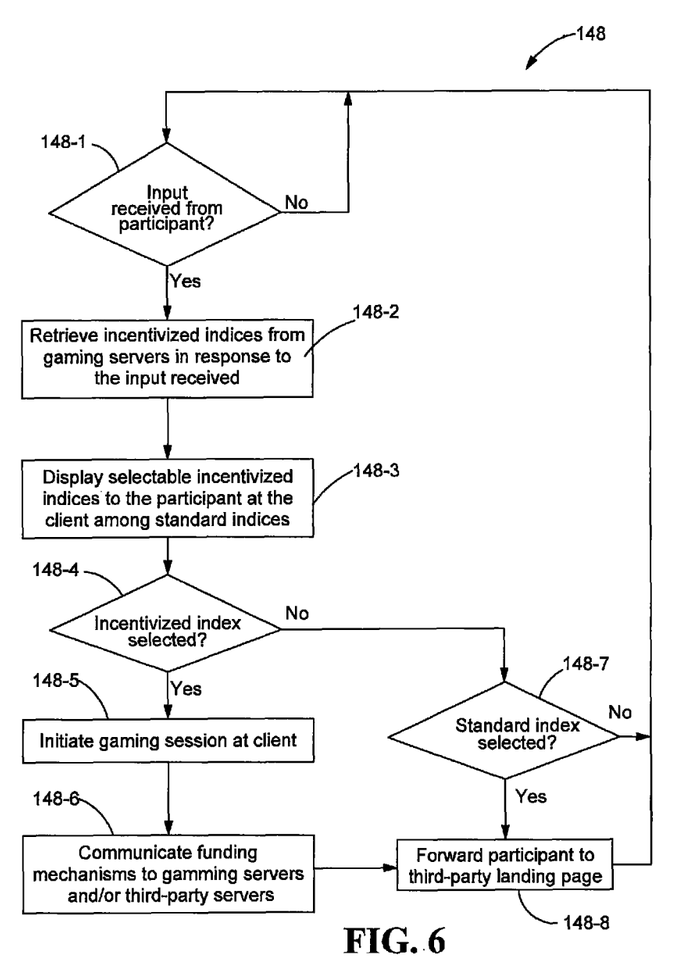
FIG. 6 is a flowchart for an algorithm that corresponds to instructions executed by one or more processors of a gaming server in accord with at least some aspects of the disclosed concepts.

Turning to FIG. 6, one exemplary embodiment of an algorithm or method 148 is provided, by which one or more of the processors 112 of the gaming servers 102 and the processors 122 of the computational device 106 may be configured to operate, for instance, in conjunction with the gaming system 100 previously discussed. The processors 112, 122 may include any one or more of a controller, a microcontroller, a microprocessor, a central processing unit (CPU), a field programmable gate array (FPGA), a digital signal processor (DSP), or any other suitable means for electronically controlling functionality of the gaming servers 102 and/or the computational devices 106. Instructions for operating the one or more processors 112, 122 of the gaming servers 102 are provided within a respective memory 114, 124 or other suitable tangible machine-readable storage media, such as a read only memory (ROM), random access memory (RAM), magnetic disk storage media, optical storage media, flash memory, or the like, that is locally or remotely disposed in communication with the respective one of the gaming servers 102 and the computational devices 106.

As shown in step 148-1 of FIG. 6, one or more of the processors 122 of the computational device 106 may be configured to monitor or determine whether the participant engages any action or provides the necessary input, such as submitting a search or query at a search page 136 of a search engine 110 using a web browser or similar interface 130. The processors 122 of the computational devices 106 may also be programmed to monitor for other detectable types of actions that may be engaged by the participant through the input devices 118 of the computational device 106. If no such input or action from the participant is detected, the processors 122 may be configured to take no further action and to continue monitoring for satisfying conditions. If, however, input is received from a participant, such as conducting a search through a search engine 110, the processors 122, for instance, in conjunction with one or more processors 112 of the relevant gaming servers 102, may be configured to retrieve one or more incentivized indices 142 during step 148-2. More particularly, the processors 122 may initiate a connection over one or more networks 108 with the processors 112 of the one or more associated gaming servers 102, and retrieve one or more of a plurality of incentivized indices 142, such as sponsored search results, or the like, which may be stored within the memory 114 of the gaming servers 102 and at least partially related to the input or query submitted by the participant.

Upon retrieving the relevant incentivized indices 142, the processors 122 of the computational device 106 may be configured to present the incentivized indices 142 to the participant, for instance, using one or more output devices 120, during step 148-3. Moreover, the incentivized indices 142 may be displayed in selectable format and along with corresponding standard indices 140. The incentivized indices 142 may be selectable using any one or more of the input devices 118 of the computational device 106 and submitted through, for example, a web browser or other comparable interface 130. When used in conjunction with search engines 110, the incentivized indices 142 may be presented as sponsored links, or the like, and included with the corresponding standard indices 140 within the list of search results. The processors 122 may also be configured to distinguish the incentivized indices 142 from the standard indices 140 using tags 144, or the like. In particular, indices that are marked with a tag 144 may be indicative of an incentivized index or gamified link 142 which redirects the participant to a desired landing page with at least partial communication with one or more gaming servers 102, while a standard index or unmarked link 140 may simply bypass the gaming servers 102 and route the participant directly to the desired landing page. The landing pages may also be varied based upon how they are accessed, for instance, by a standard index 140 or by an incentivized index 142. If an incentivized index 142 is used, the contents associated with the landing page may be gamified. For example, an online menu or catalogue that is accessed through an incentivized index 142 may generally provide the same contents as that of a standard index 140, but additionally reveal awards, coupons, and/or other incentives when the participant selects one or more of the contents, proceeds to check-out or a transaction, or the like. The awards may be regulated to prevent abuse of the gaming sessions or to provide only a limited number of awards to each participant. For example, participants may be prevented from selecting or placing several contents in their basket or cart merely to determine a secret item in play, and then removing only non-winning items from the eventual transaction. In one example, the rules of the gaming session may require the participant to pick one item out of twenty available items. Additionally, third-party sites with levels of content may award gaming credits as patrons progress through levels of patronage, for example, based on the amount spent per year, month, or the like. Such implementations may be applicable to third-party grocery sites and to their physical analogues.

In step 148-4 of FIG. 6, the one or more processors 122 may be configured to determine whether the participant has selected any of the incentivized indices 142 provided through the interface 130. If an incentivized index 142 has been selected by the participant, the processors 122 may be configured to proceed to step 148-5 to initiate one or more gaming sessions 146 to the participant, as shown for example in FIG. 5. Specifically, the processors 122 of the computational device 106 may display a gaming session 146 through one or more of the output devices 120, and further, enable the participant to interact with the gaming session 146 through the one or more input devices 118 thereof. Furthermore, the processors 122 may be configured to store various gameplay data or information pertaining to any funding mechanisms that have been placed on behalf of the participant during gameplay, as well as any winnings or rewards that have been credited to the participant during gameplay. The processors 122 may also be configured to present gaming sessions 146 having predefined or fixed odds of winning one or more rewards in response to the type of funding mechanisms placed on behalf of the participant. In addition, the processors 122 may associate such gameplay data with certain account or identification information specific to the participant. Still further, the processors 122 may associate the gameplay data as well as registration identification data with the relevant third-party that is sponsoring the particular gaming session 146 or otherwise linked thereto.

Once the participant has participated in at least one gaming session 146, the client may configure the processors 122 to communicate gameplay data pertaining to the resulting funding mechanisms, winnings and/or any rewards to one or more of the gaming servers 102 and the relevant third-party servers 104 in step 148-6 as shown in FIG. 6. For example, the processors 122 may transmit such gameplay data directly to the relevant third-party servers 104 of one or more networks 108. Alternatively, the gameplay data may be stored on the gaming servers 102 so as to be referenced or retrievable by the third-party servers 104 over one or more of the networks 108 as necessary so as to coordinate the particular funding mechanisms, winnings and/or rewards of a participant with the relevant third-parties. The processors 122 may also be configured to communicate specific information pertaining to the identity of the participant, the total amount of funding mechanisms and/or rewards accumulated by the participant that are redeemable through the third-party, and the like. In other modifications, such gameplay data may be communicated to the gaming servers 102 and/or the third-party servers 104 prior to initiating a gaming session 146, during the gaming session 146, or only after a predefined duration of gameplay and/or accumulation of funding mechanisms, winnings, rewards, or the like.

If no incentivized indices 142 have been selected by the participant during step 148-4, the processors 122 may be configured to proceed to step 148-7 and revert to default modes of operation, for instance, as instructed by the underlying algorithms or code of the web browser interface 130. More particularly, the processors 122 may determine whether the participant has selected any of the standard indices 140, and if so, forward the participant directly to the desired third-party landing page in step 148-8 while bypassing any communications with the gaming servers 102. If, however, none of the standard indices 140 have been selected by the participant, the processors 122 may return to step 148-1 to monitor for any subsequent input or queries from the participant. Additionally, once the gameplay and other relevant data have been communicated with the gaming servers 102 and/or the third-party servers 104 in step 148-6, the processors 122 may ultimately forward the participant to the desired third-party landing page via step 148-8. In other modifications, the processors 122 may be configured to render the desired third-party landing page prior to or during gameplay, for example, prior to or during any of steps 148-5 and 148-6 of FIG. 6.

Each of these embodiments and obvious variations thereof is contemplated as falling within the spirit and scope of the present disclosure as defined and set forth in the following claims. Moreover, the present concepts expressly include any and all combinations and subcombinations of the preceding elements and aspects.

What is claimed is:

1. A computer-implemented method in a gaming system, the method comprising:
   in response to a participant's search query, conducting, by one or more processors, a search on a search engine through a web browser;
   presenting, by at least one of the one or more processors, search engine results including one or more standard indices and one or more incentivized indices, each of the one or more standard indices including a selectable hyperlink for directing the participant to a third-party website, each of the one or more incentivized indices including a selectable hyperlink for playing a game initiated by one or more gaming servers and directing the participant to the third-party website; and
   in response to the selectable hyperlink of the respective incentivized index being selected, initiating the game by the one or more gaming servers and directing the participant to the third-party website.

2. The computer-implemented method of claim 1, wherein the game is a wagering game including a randomly selected outcome.

3. The computer-implemented method of claim 1, further including associating a reward from the game with a third-party associated with the incentivized index, the reward being redeemable with the third-party.

4. The computer-implemented method of claim 1, wherein the one or more incentivized indices are graphically distinguished from the one or more standard indices.

5. The computer-implemented method of claim 1, wherein the one or more incentivized indices are graphically distinguished from the one or more standard indices using one or more of color-coding, fonts, labels, badges, icons, logos, highlights, markers, watermarks, tags, borders, shading, and page position.

6. One or more non-transitory physical machine-readable storage media including instructions which, when executed by one or more processors, cause the one or more processors to perform operations comprising:
   in response to a participant's search query, conducting a search on a search engine through a web browser;
   presenting search engine results including one or more standard indices and one or more incentivized indices, each of the one or more standard indices including a selectable hyperlink for directing the participant to a third-party website, each of the one or more incentivized indices including a selectable hyperlink for playing a game initiated by one or more gaming servers and directing the participant to the third-party website; and
   in response to the selectable hyperlink of the respective incentivized index being selected, initiating the game by the one or more gaming servers and directing the participant to the third-party website.

7. The one or more non-transitory physical machine-readable storage media of claim 6, wherein the game is a wagering game including a randomly selected outcome.

8. The one or more non-transitory physical machine-readable storage media of claim 6, further including instructions which cause the one or more processors to associate a reward from the game with a third-party associated with the incentivized index, the reward being redeemable with the third-party.

9. The one or more non-transitory physical machine-readable storage media of claim 6, wherein the one or more incentivized indices are graphically distinguished from the one or more standard indices.

10. The one or more non-transitory physical machine-readable storage media of claim 6, wherein the one or more incentivized indices are graphically distinguished from the one or more standard indices using one or more of color-coding, fonts, labels, badges, icons, logos, highlights, markers, watermarks, tags, borders, shading, and page position.

11. A gaming system, comprising:
    one or more clients being provided to a participant on one or more computational devices having one or more input devices and one or more output devices; and
    one or more gaming servers in communication with the one or more clients over one or more networks comprising one or more search engines, each of the one or more gaming servers having one or more processors and one or more memory devices storing instructions that, when executed by the one or more processors, cause the one or more gaming servers to:
    retrieve one or more incentivized indices to be presented to the participant in response to a search that is executed on the one or more search engines by the participant,
    initiate one or more gaming sessions configured to interact with the participant at the one or more clients if the participant selects any of the one or more incentivized indices; and
    direct the participant to one or more third-party servers associated with the selected one of the one or more incentivized indices after at least partial interaction with the one or more gaming sessions by the participant.

12. The gaming system of claim 11, wherein each of the one or more gaming sessions provides the participant predefined odds of winning one or more rewards in response to one or more funding mechanisms placed on behalf of the participant, the instructions causing any part of the one or more funding mechanisms and the one or more rewards to be redeemable with a third-party, one or more of the funding mechanisms and the one or more rewards being provided in any one or more forms of credits, entries, points, coins, tokens, rewards, coupons, monetary awards, non-cash prizes, and social currency.

13. The gaming system of claim 11, wherein the one or more gaming servers are further in communication with the one or more third-party servers, the one or more third-party servers being associated with a third-party, the search and the one or more incentivized indices being relevant to the third-party, the one or more incentivized indices being presented in conjunction with one or more corresponding standard indices as search results, each of the one or more incentivized indices including a selectable hyperlink for at least partially directing the participant to the one or more gaming servers, each of the one or more standard indices including a selectable hyperlink for directing the participant to the one or more third-party servers.

14. The gaming system of claim 12, wherein one or more of the participant's funding mechanism and rewards is at least partially provided by one or more of the third-parties associated with the one or more incentivized indices selected by the participant, and a search provider benefiting from the participant's usage of the search engine.

15. The gaming system of claim 11, wherein the instructions cause the one or more gaming servers to deploy the one or more clients upon verification of participant information including one or more of account information, transactional information, and age verification information, the one or more clients being deployed onto the one or more computational devices through the one or more networks, and being integrated into the one or more computational devices in the form of a client taking one or more forms of a web browser extension, a toolbar, a plug-in, an add-on, a widget, an application, a dedicated device, a dedicated smart card device, and a program.

16. The gaming system of claim 11, wherein the instructions cause the one or more gaming servers to present the one or more gaming sessions through one or more of an overlaid view, a foreground view, a background view, a pop-up view, and a full-screen view at the one or more clients, the one or more gaming sessions including any one or more of a variety of different wagering games configured to interact with the participant through the one or more input devices and the one or more output devices of the one or more computational devices.

17. The gaming system of claim 11, wherein the instructions cause the one or more gaming servers to further initiate one or more of location-based and time-based gaming sessions based at least partially on prior search data cached within a memory of the one or more computational devices, the location-based gaming sessions being initiated based on the participant's location and configured to offer one or more bonus rewards to the participant for visiting an establishment affiliated with the selected one of the one or more incentivized indices, the time-based gaming sessions being configured to offer one or more bonus rewards to the participant for visiting the establishment within a predefined period of time.

18. The gaming system of claim 11, wherein the one or more clients are provided on one or more computational devices having one or more of a desktop computer, a laptop computer, a tablet device, a smartphone, and a checkout device.

19. The gaming system of claim 11, wherein the one or more incentivized indices are distinguished from the one or more standard indices using one or more of color-coding, fonts, labels, badges, icons, logos, highlights, markers, watermarks, tags, borders, shading, and page position.

20. A computer-implemented method for a gaming system, the method comprising:
receiving information pertaining to a search being performed by a participant through one or more input devices of a computational device, the search being relevant to a third-party;
retrieving one or more incentivized indices from one or more gaming servers to be displayed to the participant based on the search;
initiating one or more gaming sessions configured to interact with the participant via the computational device if the participant selects any one of the one or more incentivized indices; and
directing the participant to one or more third-party servers associated with the selected one of the one or more incentivized indices after at least partial interaction with the one or more gaming sessions by the participant.

21. The computer-implemented method for a gaming system of claim 20, wherein the one or more incentivized indices are distinguished from the one or more standard indices using one or more of color-coding, fonts, labels, badges, icons, logos, highlights, markers, watermarks, tags, borders, shading, and page position.

22. The computer-implemented method for a gaming system of claim 20, wherein each of the one or more gaming sessions provide the participant predefined odds of winning one or more rewards in response to one or more funding mechanisms placed on behalf of the participant; the method further enabling any part of the one or more funding mechanisms and the one or more rewards to be redeemable through the third-party.

23. The computer-implemented method for a gaming system of claim 22, wherein one or more of the participant's funding mechanism and rewards is at least partially provided by the third-party associated with the one or more incentivized indices selected by the participant.

24. The computer-implemented method for a gaming system of claim 20, wherein the one or more incentivized indices are presented in conjunction with one or more corresponding standard indices as search results, each of the one or more incentivized indices including a selectable hyperlink for at least partially directing the participant to the one or more gaming servers, each of the one or more standard indices including a selectable hyperlink for directing the participant to the one or more third-party servers associated with the third-party.

25. The computer-implemented method for a gaming system of claim 20, wherein the one or more gaming sessions are presented to the participant through one or more of an overlaid view, a foreground view, a background view, a pop-up view, and a full-screen view at the one or more clients, the one or more gaming sessions including any one or more of a variety of different wagering games configured to interact with the participant through the one or more input devices and one or more output devices of the computational device.

26. The computer-implemented method for a gaming system of claim 20, wherein the one or more gaming sessions initiate one or more of location-based and time-based gaming sessions based at least partially on prior search data cached within a memory of the computational device, the location-based gaming sessions being initiated based on the participant's location and configured to offer one or more bonus rewards to the participant for visiting an establishment affiliated with the third-party and the selected one of the one or more incentivized indices, the time-based gaming sessions being configured to offer one or more bonus rewards to the participant for visiting the establishment within a predefined period of time.

27. A non-transitory tangible machine-readable storage media including instructions which, when executed by one or more processors, cause the one or more processors to perform operations comprising:
   monitoring for one or more inputs provided by a participant through one or more input devices of a computational device;
   retrieving one or more incentivized indices from one or more gaming servers to be displayed to the participant at an output device of the computational device if the participant engages one or more of the inputs, each of the one or more incentivized indices corresponding to one or more standard indices associated with one or more third-party servers;
   initiating a gaming session for interacting with the participant if the participant selects one of the one or more incentivized indices; and
   directing the participant to the one or more third-party servers associated with the selected one of the one or more incentivized indices after at least partial interaction with the gaming session by the participant.

28. The non-transitory tangible machine-readable storage media of claim 27, wherein the gaming session provides the participant predefined odds of winning one or more rewards in response to one or more funding mechanisms placed on behalf of the participant, the one or more processors being caused to further communicate at least part of the one or more funding mechanisms and the one or more rewards to one or more of the gaming servers and the third-party servers, and enable any part of the one or more funding mechanisms and the one or more rewards to be redeemable with a third-party.

29. The non-transitory tangible machine-readable storage media of claim 27, wherein the one or more inputs include conducting a search on a search engine through a web browser, the one or more incentivized indices and the one or more standard indices being presented to the participant as search results, each of the one or more incentivized indices including a selectable hyperlink for directing the participant to the one or more gaming servers, and each of the one or more standard indices including a selectable hyperlink for directing the participant to the one or more third-party servers.

30. The non-transitory tangible machine-readable storage media of claim 27, wherein the gaming session includes any one or more of a variety of different wagering games that is presentable through the output device of the computational device.

* * * * *